United States Patent [19]
Kaske

[11] Patent Number: 5,774,632
[45] Date of Patent: Jun. 30, 1998

[54] METHOD AND DEVICE FOR THE CONTROL OF AN AUTONOMOUSLY EXPLORING ROBOT

[76] Inventor: Alexander Kaske, Johann-Bueren-Str. 3, 50933 Köln, Germany

[21] Appl. No.: 554,948

[22] Filed: Nov. 13, 1995

[30] Foreign Application Priority Data

Nov. 15, 1994 [DE] Germany .......................... 44 40 859.5

[51] Int. Cl.$^6$ ..................................................... G06F 15/18
[52] U.S. Cl. .................................. 395/22; 395/23; 395/88
[58] Field of Search ................................... 395/22, 23, 24, 395/10, 81, 94, 88; 701/23; 364/167.01; 382/103; 318/601

[56] References Cited

U.S. PATENT DOCUMENTS

| | | | |
|---|---|---|---|
| 4,884,216 | 11/1989 | Kuperstein | 395/94 |
| 5,063,492 | 11/1991 | Yoda et al. | 364/167.01 |
| 5,111,531 | 5/1992 | Grayson et al. | 395/23 |
| 5,124,918 | 6/1992 | Beer et al. | 701/27 |
| 5,319,738 | 6/1994 | Shima et al. | 395/24 |
| 5,323,470 | 6/1994 | Kara et al. | 382/103 |
| 5,357,432 | 10/1994 | Margolis et al. | 701/23 |
| 5,392,382 | 2/1995 | Schoppers | 395/10 |
| 5,448,681 | 9/1995 | Khan | 395/11 |
| 5,498,943 | 3/1996 | Kimoto et al. | 318/601 |
| 5,548,512 | 8/1996 | Quraishi | 701/23 |
| 5,579,442 | 11/1996 | Kimoto et al. | 395/81 |
| 5,608,843 | 3/1997 | Baird, III | 395/23 |

OTHER PUBLICATIONS

Miller, Learning dynamic balance of a biped walking robot, 1994 IEEE conference on neural net, pp. 2771–2776, Jul. 2, 1994.

Faibish et al., Neural reflexive control of a mobile rotor, 1992 IEEE, pp. 144–146, Aug. 13, 1992.

Gosh et al., Multisensor fusion using neural networks, 1990 second IEEE symposium on parallel and distributed processing, pp. 812–815, Dec. 13, 1990.

Dong Kwon Cho et al., Intelligent motion control strategy for mobile robot in the presence of moving obstacles, IROS 91., pp. 541–546, Nov. 5, 1991.

Implementation of Self–Organizing Neural Networks for Visuo–Motor Control of an Industrial Robot, by Jörg A. Walter et al., *IEEE Transactions on Neural Networks,* vol. 4, No. 1, Jan. 1993, pp. 86–95.

Fukuda et al., Hierarchical control system in intelligent robotics and mechatronics, IECON 93, pp. 33–38, Nov. 19, 1993.

Simon et al., A fault tolerant optimal interpolative net, 1993 IEEE conference on neural net, pp. 825–830, Apr. 1, 1993.

Tani et al., Embedding task–based behavior into internal sensory–based attractor dynamics in navigation of a mobile robot, IROS 94, pp. 886–893, Sep. 16, 1994.

Thrun, Exploration and model building in mobile robot domains, 1993 IEEE conference on neural networks, pp. 175–180, Apr. 1, 1993.

Berns et al., A neural network approach for the control of a tracking behavior, 91 ICAR, pp. 500–503, Jun. 22, 1991.

Banta et al., Sensor fusion for mixing robots, IEEE transactins on industry applications, pp. 1321–1325, Oct. 1994.

Salatian et al., Gait synthesis for a biped robot climbing sloping, 1992 IEEE International conference on Robotics and Automation, pp. 2607–2611, May 14, 1992.

*Primary Examiner*—Robert W. Downs
*Assistant Examiner*—Sanjiu Shah
*Attorney, Agent, or Firm*—Evenson, McKeown, Edwards & Lenahan, P.L.L.C.

[57] ABSTRACT

In a control method and a control device for an autonomously exploring robot, sensory values induce, in a strategy generating network, control sets according to inner connectivity which is acquired in a training phase. The control sets control acting units which act on the environment. Control sets and sensory values are given as input to a network system which distinguishes between already trained pairs of values and unknown pairs of values.

33 Claims, 4 Drawing Sheets

METHOD AND DEVICE FOR THE CONTROL OF AN AUTONOMOUSLY EXPLORING ROBOT

BACKGROUND OF THE INVENTION

This invention concerns a method as well as a navigating device for controlling an automatic robot.

In work environments that may be potentially dangerous or unaccessible for humans, it may be preferable to employ a robot. This robot could be controlled either by remote control or by an implemented program running on a computer.

The use of remote control is preferable, because the operator would be able to communicate more directly with the robot. However this is not always possible, especially in cases in which the distance between the operator and the robot is large or in which a disturbance in communication between the operator and the robot could arise.

In comparison, a robot that is programmed is able to work more independently than a remote controlled robot. In this case, the application of a program requires extended pre-programming to take all foreseeable situations into account so that the robot can effectively handle these situations when they arise. Should a robot be employed to do work in either an unknown working environment and/or where conditions may occur that were unforeseeable at the time of programming the robot, a programmed robot could fail. Trying to meet such situations by increasing the number of stored situations using a database, however, will result in considerable retrieval times. In such a way, the robot is set out of action for a considerable period of time when confronted with an unknown situation until an adequate strategy for solution is found in the database. This could be a disadvantage if the robot is caught in a situation which requires immediate action.

Applications of networks in combination with preprocessing Kohonen-maps are known. However, these applications are not able to distinguish between known and unknown situations. No specific evasive behavior in relation to unknown situations can be generated. Additionally, in such new situations, the behavior is completely stereotypical because the value captured by the sensory devices generates the control set which is associated to the closest sensory value. Variation of behavior could only be generated by superposition of output values which corresponds to the most similar stored situations. Such a superposition, however, is almost shut out by the filtering effect of the Kohonen-map. Possibly, instabilities in the activity patterns of the Kohonen-map, which are related to the similarity to stored patterns, could result. The system would just try out its repertoire of stored actions. A learning process occurs only after the success of one of these trials. The specific new action of this situation, which is not explicitly coded in this process, gets almost completely lost. Just the Kohonen-map would slightly change. In the case of success, the network would learn little from this situation; the prototypes represented in the Kohonen-map would just undergo expansion or diminuition while the output repertoire stays the same. No consequences could be derived in the case of failure.

SUMMARY OF THE INVENTION

It is an object of the present invention to create a method and a device, of the before mentioned kind, which allows the robot, within a real-time mode, to distinguish between known and unknown situations.

This object is accomplished by the use of an invented network system. As a result of this use, the robot does not need an extended data base of possible situations. It suffices to train selected pairs of values—captured by the sensory devices from the environment and the corresponding control sets—to the robot during a training period. Such a training leads to specific adaptation of the synapse strengths of the involved networks. If, during action of the robot, the invented network system recognizes a known pair of values captured by the sensory devices and the corresponding control values generated by the strategy generating network, then this pair of known values allows the method to proceed to another stored pair of values. This allows the robot to follow a known pathway of solution. Additionally, the opportunity is developed to gain experience in that form. The pairs of values preceding the recognized one will be captured and stored together with the recognized one. Being a result of actions of the robot, unknown pairs of values can be converted to known pairs of values by this storing process. If, in a future situation, a known pair of values occurs again, then the opportunity exists to reconstruct the other unknown pairs of values of that situation by behavior or to increase the experience by storing them.

The trained pairs of values determine, by their sequence, the solution path which characterizes the fulfillment of a task. The task is defined as reaching a subspace H of all possible pairs of values (S1—output vector, S2—input vector). At a first stage, the task and, consequently, the behavior of the robot is determined by the starting position in the (S1S2) space and the subspace H which is the target. An additional selection of behavior of the robot can be done by placing the robot into defined S1S2 subspace of the pairs of values. This can be achieved by a command setting some S2 components or by direct influence of the inner S1S2 state of the robot. A selection of solution paths is made this way, but there are still a variety of possible paths connecting H and the starting position. Therefore, in a second stage, selected parts of such solution paths could be rewarded directly from outside (direct interference or direct shift to H). Starting from an (eventually randomly generated) initial repertoire of stored pairs of values, the system can increase its repertoire by variation of the initial repertoire. Such variations are generated by the influence of the chaotic states on the strategy generating network. Chaotic dynamic of the network system occurs in unknown situations in which no path of solution exists and must be generated. Those new pairs of values are selected for training which lead directly or via already stored pairs of values, defining a solution path, to H. In other words, all stored pairs of values define a path leading to H. Practically, the stored pairs of values are an extension of H. The robot, therefore, uses a trial and error learning strategy, with the additional features that, predominantly, the most successful pairs of values are varied, implementing a kind of evolutionary optimation strategy. There is a strong analogy to a genetic algorithm which is completed by a crossing-over procedure explained later. The advantage of this approach is that no explicit cost functions or other evaluation procedures, which require intimate knowledge about the problem, are necessary. There is, therefore, no need to determine how to evaluate the quality of the behavior before reaching the task. Another advantage is the possibility to exploit this evolutionary strategy further. The relative simplicity of transferring selected pairs of values, which represent H, into added modules of the same design makes a recursive differentiation and extension of this strategy possible. For this additive extension process, a recursive approach is proposed, leading to a fractal architecture of modules. Again, the most successful modules are effected by this process. Because H is, at first, not changed by this addition of modules, the functional integrity is preserved. Only new resources are provided for further learning. The proposed architecture, however, makes sure, by using symmetry breaking measures, that the new resources lead to differentiation and not mere duplication of the old solutions.

The proposed network system operates as a kind of cognitive interferometer that distinguishes very sensibly between values stored by high feedback and the training process—only these are stable and new unstored values. This allows one to deal specifically with the new aspects of a situation (cautious exploration or evasion). The dynamic of the network system propagates, unfiltered, to the strategy generating network and modifies the behavior (control sets) intended in this situation. Using this behavior of the network system, it is possible to stabilize the behavior in known situations—promising success—and to vary behavior in the form of varied control sets in unknown, nonpromising, situations. The storing process of the behavioral variants takes place in a situation specific manner leading to an extension and differentiation of the discriminative power for situations and of the repertoire of behavior.

Consequently, the system can learn, at least indirectly, by "errors", "errors" meaning the occurrence of new and unexpected situations which require the modification of behavior. The disruption of expectation and the staying away of success are explicitly captured and labeled by the unstable state of the network system. The elements of behavior which lead to a correction of "errors" are generated by variation of behavior and, subsequently, selected and stored while representing the specific circumstances of the situation (training). If learning processes are not to occur, then the system is still able to label the same "error" (=unexpected situation) under the same circumstances. In such a way, the system notices "errors" and adapts its behavior accordingly.

One has to notice that, in the context of the invention, sensory devices are to be considered to include devices which may each consist of one or more sensors or sensorlike modules. The sensors can capture different kinds of physical values and can transform them, if necessary, into a form suitable for the used networks. In the following, under the conception of acting units, every device is included that enables the robot to act, either via the manipulation of any form of physical instrument acting as a physical extension or via the recalibration of the susceptibility of the sensors. Especially included as acting units are combinations of networks, regulators and/or servos, which may have additional capability for local sensory information processing. By this option, it is possible to differentiate, at least partially, the receiving control sets on the ground of locally in time (during a too sluggish variation of control sets) and space available information in an autonomous manner. This leads to relief of a processing load on the strategy generating network. Between such differentiated acting units and a hierarchical organization of networks exists a great similarity. It is to be noted that a control set can be considered as any form of order to such an acting unit.

In the inner structure of a strategy generating network and network system, the strategy generating network consists of a heteroassociative network (a Willshaw-matrix as a simplest implementation) or an autoassociative (a Hopfield-net for instance) network. The limitations of these network types are at least partially compensated by an optional preprocessing Kohonen-map which may additionally receive feedback signals from the associative network. A back propagation network could be used but is not really necessary and rather resource consuming.

The network system consists of 2 Kohonen-maps (KK1, KK2) and 2 heteroassociative or autoassociative networks (B1, B2). The arrangement shows a high degree of symmetry which is crucial for the dynamic of the network system. The training process is related to this symmetry. On the first Kohonen-map KK1, the S1 (control sets) and the output of B2—the associative network that gets its input from the second Kohonen-map KK2—converge (crossed feedback). Projection of B1 on the map KK1 (direct feedback) may be optional. S2 (sensory values) and B1 converge on the map KK2.

It is to be noted, further, that the training process for the strategy generating network and for the networks of the network system displays a double loop. The training of the network system represents the inner loop. Every pair of values is fed into the networks of the network system until the adaptation of synapses has led to a stable output pattern. After this, the outer loop is activated so that the same pair of values previously offered to the network system is fed to the strategy generating network (optionally filtered by a preprocessing Kohonen-map) plus the now stable output patterns of the network system as the training vector combination. Should both loops run simultaneously, the strategy generating network would learn all the unstable phases during the learning process of the network system.

For the discrimination of known pairs of values from unknown pairs of values, it is intended, by the invention, to analyze the dynamic patterns of the output of the network system with a device here termed a dynamic analyzer. On the criteria of dynamic stability of the output of the networks of the network system, the classification of known pairs of values takes place.

Besides the output of the networks of the network system, the results of the classification of the dynamic analyzer can be given as additional input values to the strategy generating network. The dynamic can be classified as go-, no go- and chaotic states. The go state is recognized as stability in the output patterns of the networks of the network system. In other words, a known pair of values has been captured. The chaotic state (complete dynamic instability) results if an unknown pair of values is fed into the networks of the network system. The no-go state is intermediate to go and chaos states and characterized by the approximate development of a limit cycle. The no-go state signals the known status of the instant sensory values, but that these values do not fit to the actual control set. Therefore, it could be implemented to react to no-go states with avoidance by turning away from the sensory configuration causing it or ignoration. Through this behavior, the robot will regain access to a corridor of known values faster. The transition between no-go and chaos states is a smooth one. Therefore, new pairs of values can be ignored while classified as no-go states. But within a short time period, in which turning away or ignoration does not lead back into the range of known values, a prolonged chaos state results. Now the developing chaotic dynamic of the network system can gain increasing influence on the strategy generating network, creating completely new control sets with subsequent actions. Prolongation of further chaotic/no-go states could switch on explicit regressive strategies. Examples include the return of the robot to the starting point or to that point at which the last known (stable) pair of values was recorded.

The values captured by the sensory devices need not be scalars. Many component vectors can be the control sets. For data compression (and orthogonalization), the sensory data and the control sets converge on the Kohonen-maps (KK1, KK2, KK3) of the network system and the strategy generating network.

Concerning the training process, the Kohonen-maps should adapt slightly slower than the associative networks of the network system and strategy generating network, because the latter need stable input/output relationships. An overall adaptation of the Kohonen-maps clearly facilitates learning and is necessary to establish the overall input/output relations. A solution would be to train the Kohonen-maps and associative networks separately, holding the other networks constant.

Additionally, it may be an advantage to allow synaptic adaptation of the Kohonen-maps intermittently or constantly to represent the statistics of sensory data and control sets in the Kohonen-maps irrespective of behavioral success. This facilitates the "cognitive" adaptation of the robot to the terrain and the tasks.

All values captured by the sensory devices and the values of the control sets are stored (until they are replaced by new values) in a short term memory as well as converging on the network system and the strategy generating network. If the network system identifies a pair of values as known and belonging to a successful string of values, then all the values preceding that pair of values (which are currently buffered in the short term memory) are added to that string by a learning process. New pairs of values are added to the old ones in a kind of polycondensation or cinetic aggregation. Already existing strings of pairs of values are improved and developed. To keep an option open, it should be possible to initiate a training process analogous to the above described one by direct reward independently of the above mentioned criteria. In this way, it is possible to keep control of the training process afterwards. The formulation of observer independent learning criteria has been already done by the initial selection of the pairs of values which define H.

During the training process, selected pairs of values each consisting of a pair of control set values and sensory data (values captured by the sensory devices), are provided for learning to the networks of the strategy generating network and network system. During training, the synapses adapt to reproduce the right response to the trained input.

The following simplified example (a special case of the description) shows how the learning process—adjusting the synapse weights—must be organized to realize the necessary behavior of the network system. For simplicity, the back projection of each network (B1/2) to its preprocessing Kohonen-map (KK1/2) is omitted. If this projection is included, then it is treated as external in the balancing of synapse strengths.

The K-maps K1, K2 are characterized as usual (Ritter et al 90): "intensity" of input $x_i$ is normed $\|x\|=1$ as synapse strength $\sqrt{\Sigma w_{r1}^{e,i2}}=1$ (represented as integers) independently for S1, S2–($w_{r1}^e$,e for external) and B2, B1 input ($w_{r1}^i$ for internal); consequently $\sqrt{\Sigma w_{r1}^e}=\sqrt{\Sigma w_{r1}^i}$ x(K1)=x(S1$^e$, B2$^i$); x(K2)=x(S2$^e$, B1$^1$) $\Delta w_{r1}=\epsilon(h_{rr'}x1-h_{rr'}w_{r1})$ is simplified to $\Delta w_{r1}$=step up if $\delta(r-r')(x_1-w_{r1})\geqq 0$ otherwise step down. wr1 $\epsilon[0, 10]$; $h_{rr'}$=exp(−(r−r')$^2$/2σ$^2$) spot of activity around the maximally active element r'.

The networks B1, B2 were (for simplicity of calculation) transformed identically. Input $x_1$=1 for l=r' (and if $x_1$ is above a given threshold to prevent activation by noise alone) otherwise 0; $y_1=c*x_1$; c=1+C'(sin(C"t)+C'''rs) during performance, c=1 during training (C', C", C''' are constants regulating synchronous and asynchronous fluctuations of y1 to break eventually existing symmetries, rs noise $\epsilon[0.1]$).

Under these conditions, the output of the networks KK1 and KK2 stay stable in the presence of known values, while the outputs of B1/2 show the above described fluctuations (it would be equally possible to let the amplitude of the S1S2 inputs fluctuate in an analogous manner. Additional fluctuations of the output amplitude of B1/2 would become unnecessary.)

The following generalizations and variations of this scheme, being still special cases of the general description of the network system, present themselves:

1) The coding of the position and state of activity of the active neuron (or cluster) in the preprocessing network KK1/2 by B1/2 performing the identical transformation can be replaced by another method. In comparison to the KK1/2 maps, the dimension of the output of B1/2 is allowed to be different (higher or lower) by using a code (a linear code for instance) B1/2 can perform. The distance d of vectors in code space representing different neurons (position plus activity) should be maximal and equal. They should be as "orthoganal" as possible. The simplest code would be to represent the activity of the KK1/2 map as the (binary) index number of the one active neuron.

2) The synapses of B1/2 are allowed to change as long as the normed output differs at least by d/2 from any other output of the (changing) code repertoire. Such adaptations could improve the learning process. Then, a change of the (normed) output of B1/2 should maximize the output of the neuron r in the KK1/2 map chosen (see below) as the center of activity. Viewing the synapse weights $w_{r'1}^i$, of neuron r' as a vector (by suppressing index r'), maximizing $\sqrt{\Sigma w_{r'1xB}^i}$ comes down to maximizing the inner product of these vectors. Consequently, they should point into the same direction. Having access to $w_{r'1}^i$, this could be done directly; otherwise a trial and error routine-loop must be applied.

3) Another method for dynamic destabilization of the network system can be achieved by (moderate) highpass filtering of the S1, S2, B1, B2-signals. Therefore, it is necessary that S1/2 and B1/2-signals are asynchronuous. That means the processing time of B1/2 must not be neglected. Otherwise the symmetry breaking effect of this measure is cancelled out.

4) Starting from these descriptions of the learning rule for the single networks of the network system, the description of the general outline of the learning process follows:

A new pair of values (S1S2) is fed into the network system. From the unstable patterns generated in this test run, one can choose the most frequent pair of simultaneously activated neurons in KK1 and KK2. Alternatively, in analogy to the usual training process of Kohonen-maps, a pair r' which shows the maximum response (sum of both amplitudes) to the constant S1/2 input and to the resulting B1/2 output can be chosen. In other words, the pair in which the neurons in the different maps reinforce each other can be chosen. Each neuron of this pair now becomes the neuron r' in its Kohonen-map in the usual training procedure (plus the above described conditions of internal/external synapse balance). By this selection, in storing a new pair of values, the rearrangement of synapse weights is least. To put it more generally, selection of the pair of neurons r and the subsequent rearrangement of synapses (in all networks including B1/2) to establish a stable response pattern should take place in a way requiring a minimum of synaptic rearrangement. Consequently, old representations are disturbed least. If necessary, further cycles of a test run, selection of a neuron pair and synapse adaptation can follow.

The same advantages as described in connection with the method apply to a device for achieving the object discussed above. Concerning the design of the network system, each network of the network system (B1/2) projects its output to the preprocessing Kohonen-map of the other network and to its own preprocessing Kohonen-map. Using more networks (each one with a preprocessing Kohonen-map), the output of these networks should reach the Kohonen-map of at least one other network.

The dynamic analyzer applies a Fourier analysis of the time series of the output of the networks in the network system and of the simultaneous pair of values (sensory data and control set generated by the strategy generating network). The spectra generated by the network system and of the pair of values are compared. If they are equal, then a go state is signaled. If there are too many harmonics in the dynamic of the network system in comparison to the S1S2 input (pair of values), then a no-go state is signalled. If there are no more relations (like common ground frequency) between the spectra of the network system and its input (S1S2), then a chaos state is signalled.

The search in Fourier space is determined by the sampling frequency and by the size of the time window which limits the analyzed period. The classification of the spectra into the different states based on their amplitude relations can be optimized by variation of the assignment of amplitude relations to the classes. This variation could be controlled by the strategy generating network. Being multicomponent vectors, the output values of the network system, theoretically all vector components, should undergo Fourier analysis. Which components of the pairs of values should be compared (their spectra) with what components of the output of the network system is a completely arbitrary decision. For instance, a neural network could do such a classification based on criteria which have to be lined out later by correlating the spectra (relations) of inputs and outputs of the network system. An easier approach is to add the spectral amplitudes (normed and weighted if necessary) at least of the components of the pairs of values. The same can be done with the output values of the network system. But it is now possible to compare each component of the output of the network system separately with the compressed spectrum of the pairs of values. In this way, for each component of the output, it is possible to assign a go state, no-go state, or chaos state. For reduction of computation, input and output of the network system can be projected into (lower dimensional) subspaces prior to Fourier analysis and spectral comparation. Other methods for dimensional reduction, like trace S1*S2 and trace B1*B2, can be applied. Because of the high number of possible variations to realize such a dynamic analyzer and because of the high amount of computation involved in Fourier analysis, a primitive scheme of Fourier analysis is proposed.

The pairs of values and the output of the network system are read into separated buffers (short term memories) and analyzed for periodicity by evaluating the distance (euclidic or Manhattan metric) of each vector within the buffer with any other (shifted in time) of the time periods stored in the buffer. If this distance is smaller than a given threshold s, then a point is given.

The number of points is given by the double summation over the number i of the y elements stored in the buffer and the number n (from 1 to y/2) indexing the modes of time shift
$p=\Sigma_i\Sigma_n$ fi (xr1)+fi(xr2), fi (xr)=1 if d(xi-xr)<s or else 0.

r1=n+i modulo y, r2=2n+1 modulo y, i goes from 1 to y, n goes from 1 to y/2, $x_i$ read in vector in position i of the buffer.

This procedure is done separately for the output of the network system and the pairs of values. The difference of points, after subtracting the points representing the dynamics of the output values from the points representing the dynamics of the pairs of values, is a maximum of 0 if the output values are comparatively stable. The difference gets more negative with an increasing instability of the output values compared to the pairs of values. Higher harmonics in the output values would lead to an intermediate negative difference. This difference can be used for classification of the dynamic states of the network system.

The short term memory is designed as a buffer in such a way that the new (pairs of) values entering one side of the buffer push out the oldest values at the other side. All intermediate pairs of values move one step towards the exit, getting "older" with each replacement step.

The intensity of the training, i.e. the number of learning cycles, can be designed to reflect the relation or the difference between reward and integrated energy costs. This can be used as an additional criteria for selection training only those pairs of values which lead to a gain of energy. To integrate this additional criteria into the recursive training process for new pairs of values, known and stored pairs of values must be associated with a value coding the reward. This value then serves as a reference point from which the further distribution of reward to the newly added elements of pairs of values can be calculated. A variety of schemes for this task is possible. For instance, a recursive method can be applied. The value of reward (in terms of energy) associated with the first pair of values (the one closest to the event of receiving the reward) is calculated by subtracting the costs associated with the transformations controlled by this pair from the brutto reward. This netto reward is then distributed to the second pair of values where the same procedure takes place and so on until there is no netto reward left.

Similar results can be achieved by summing up rewards and costs over some consecutive pairs of values. The resulting mean netto reward can then be assigned to the single pairs of values, although the gradient of reward is defined less precisely this way. But a superposition of multiple learning processes will lead to a refinement of this gross gradient. A steep gradient can be achieved by selecting a suitable formula to distribute the netto reward between the pairs of values stored in the short term memory.

An additional feature is the use of band pass filters, which can be placed between sensors or short term memory and the Kohonen-maps of the network system and the strategy generating network.

The band pass filters are used to cut out the components of the signal (in the time series) making the response of the subsequent systems difficult. The filter is mainly characterized by two parameters. These parameters are the central frequency (of transmittance) of the filter and the bandwidth around this frequency. Both parameters are controlled by the dynamic analyzer (associated with the network system). The central frequency is given by the ground frequency of the network system. The bandwidth is increased (up to a limit) during go states and decreased during no-go or chaos states.

If the present invention is part of a bigger network architecture, then it can be useful to place such band pass filters between the hierarchies of such a big network. The output of networks lower in hierarchy building the bulk of the input to the higher hierarchies can be filtered too. This filter should operate this way: The network higher in hierarchy does not need to know much about the operation of the subordinate one as long no disturbance occurs in the operation of the latter. Consequently, the band pass filter should be opened by the chaos state of the subordinate network, providing more information to the higher hierarchies. Otherwise, the bandwidth should be reduced. Filters operating on input and output between the hierarchies can be combined and controlled together by both interconnected hierarchies according to the above mentioned criteria. Delayed feedback signals from the short term memory and from higher hierarchies can be band pass filtered too. The filters operating on those signals are controlled from the network system of the receiving structure.

Additionally, delayed (in time) pairs of values already contained in the short term memory can be fed into the Kohonen-map of the strategy generating network and the Kohonen-maps of the network system. The values are fed mainly to the map KK1 because there is more space left due to the lower dimension of the S1 vector. This leads to the advantage that the networks can detect and store causal relationships between the different (in time) pairs of values. Missing sensory data can be at least partially replaced by delayed signals. The dependency of the system and its strategies come from the momentarily given sensory values. The network system can now evaluate single pairs of values, placing them into the context of whole strings of pairs of values. Delayed feedback would be suitable for the network system to learn whole sequences and to modulate those of the strategy generating network. The impact of the feedback should be regulated according to the situation. The go, no-go, or chaos state, in particular, should be considered. During prolonged chaos states, the amount of feedback should be reduced (reducing bandwidth, number of components, timescale of delay, etc.) to bring the "attention" of the system closer to the present situation.

If no-go states induce mainly avoidance reactions, which are often most successful to bring the system back into the go state, then there is not enough interaction with new situations. Power of discrimination and the repertoire of behavior stagnate. To prevent this stagnation, sufficient prolonged chaos states should be induced. A supervising computer controls this process.

In an on-line exploration phase, if, in a given time period, not enough chaos states occur (summation via leaky integrator), then the supervising computer induces chaos states by replacing the (instantaneous) task specific components of a "task-vector" by stochastic values (at least partially). The "task-vector" is the almost permanent input which places the robot in the subspace associated with the task. Therefore, these vector components are known. But their stability can be used to extract those components as a derived value from the short term memory. This stochastic variation leads to new pairs of values which are subsequently stored (in the network system alone).

According to task definition, by placement of the robot into a specified subspace of the (S1S2) space of pairs of values, the task-vector signifies this subspace. For simplicity—the robot can leave this subspace only by solving the corresponding task to reach H—all components which stay constant for some time can be defined as a task vector. Context and task specific information are here treated the same. Context information is now defined as the stable complement of the covarying sensory motor actions of the robot.

The benefit of replacing task/context signalling components by stochastic values—out of the union of the so defined sunspaces—is that sequences of sensory motor reactions are not very much affected by this measure. Instead, new sensory motor reactions are generated by combining them with the new (stochastic) context markers. This is a precondition for the transfer of such sensory motor routines into a new context or task. The probability that such routines "survive" this treatment is high if only a few context components are effected. The distance from the variated pair of values to the "right" pair is below the resolution of the strategy generating network. Letting Ak be the dynamic range of variation of the context-components and A0 be the mean dynamic range of representation in the Kohonen-map KK3, k (number of variated components) is very roughly given by $k \leq A0/Ak$. Context-independent action patterns are hardly effected by this restriction, because $\Sigma\ W_{ik}\ \Delta X_k$ is small compared to the resolution of the map ($\Delta X_k$ is the range of variation of context components, being a range of summation).

Should a lack of energy or an acute threat or task occur, this on line exploration is interrupted. The same holds for exhaustion of storing capacity of the network system or if the induced chaos states have lasted enough. Eventual dangers are avoided in this way.

An off-line phase of transfer of knowledge is induced by the supervising computer if enough chaos states occur or the storing capacity of the network system is exhausted. The acting units and sensory devices are disconnected from the strategy generating network, network system and short term memory. The sensory data are replaced by stochastic values which induce the corresponding control sets in the strategy generating network. Stochastic "sensory" data (S2) and induced control sets (S1) are fed as input into the network system which, in turn, projects to the strategy generating network. Viewed from the strategy generating network, these values and the knowledge stored in the network system replace the interaction with the real world. The variation of the stochastic values leads to a kind of playing to the whole repertoire of pairs of values. By this interaction of the network system (in which pairs of values of the exploration phase are exclusively stored) and the strategy generating system, knowledge of the exploration phase is transferred into the strategy generating network. In this process, the similarity of occurring (stochastic) activity patterns (S1S2) to stored patterns is very important. To provide an additional source of variation and selection it is important that there is a difference of stored patterns in the network system and the strategy generating network. Otherwise (especially if intensity of the stochastic S2 is low), the network system and the strategy generating system would synchronize to just replay stored patterns, stabilizing each other. This mutual stabilization between these structures is at least intermittently interrupted by the stochastic S2 values. The same occurs when stochastic values and induced control set reproduce a pattern of the exploration phase (which is unknown to the strategy generating network).

The intensity of the stochastic sensory values (S2) limits the probability for the continuation of an ongoing sequence of pairs of values. It is very roughly given by:

$p = 1/nr$ if $\Sigma w_{ij} x_{S1} \approx \Sigma W_{ij} X_{S2}$ for the "right" neuron i in the Kohonen-maps KK2 and KK3. 1/nr is the number of neurons around neuron i representing roughly the same S1 values but different S2 values. $x_{S1}$ are the S1 components summed over v, and $X_{S2}$ are the S2 components summed over j. If intensity of stochastic S2 is very low, then p goes to 1 and if intensity is high, then p goes to 1/n (number of neurons in the Kohonen-maps).

The intensity of stochastic sensory values then becomes a tuning parameter for the length of strings reconstructed and conjoined during the off-line phase. Again, those routines are most successful to "survive" this procedure which are relatively independent from external sensory data (the first sum then becomes rather low). This applies to sequences which are mainly controlled by reafferent signals ((delayed) feedback).

The following is happening if the stochastic values (S2) and the control set induce the corresponding unstable activity pattern in the network system (only this case is discussed in more detail). The resulting output-signals from the network system (and the stochastic values S2) have not been stored previously in the strategy generating network. The dynamic (of classification) is, therefore, unstable in the strategy generating network leading to unstable (and new) control sets (S1). Practically, the strategy generating network is dominated (in its dynamic) by the network system which, in turn, underlies a variety of unstable (new) control sets until (by chance) the whole system is stabilized by a triple of known control set, stochastic sensory values and stable output of the network system. Within the discrimatory power of network system and strategy generating network, a subset of pairs of values acquired during the exploration phase is reconstructed. This holds now for the strategy generating network too. The response of the network system occurs corresponding to best fit criteria. The patterns represented in the Kohonen-maps, especially the ones acquired (the other cases are trivial) during the exploration phase, are now selected by the occurring pairs of values (control sets S1; stochastic sensory values S2). The simultaneously activated triple of output of the network system, stochastic sensory value and output of the strategy generating network is equivalent to a reconstruction of the pairs of values of the exploration phase. The response of the strategy generating network follows a best fit criteria too. The triple of values (output network system, pair of values) resulting from this off-line interaction can be trained to a network system and a strategy generating system. Pairs of values classified as unknown by the network system (plus a dynamic analyzer) can be "spliced out" previously, introducing a means for selectively cutting out "nonsense" sequences.

The off-line phase is terminated by acute danger, acute task related demands or the end of the predefined period of time. This time period is proportional in length to the frequency of previous chaos states which, in turn, is roughly determined by the length of the exploration phase.

The result is that a subset of pairs of values acquired during the exploration phase is transferred into the strategy generating network according to best fit criteria. This selection and the ongoing dynamics allow it to interpose exploratory pairs of values with already stored pairs of values. This proximity (in sequence) practically alters the state of the exploratory values. They gain "normal status". A crossing over of exploratory values into task relevant pairs of values takes place. The new generated repertoire is selected during task related behavior.

In general, only a subset of the pairs of values including those acquired during the exploratory phase is reconstructed in this off-line phase. The other pairs of values could undergo accelerated "forgetting" (increased relaxation of synapses during the off-line phase). By this measure, new storing capacity could be generated while increasing the importance of the pairs of values occurring in the off-line phase. Additional selection criteria reducing the number of patterns to be stored include cutting out repetitions of equal pairs of values within the sequence length allowed by the capacity of the short term memory and cutting out too unstable pairs of values.

Within a network architecture consisting of modules which contain a network system and a strategy generating network, interconnected in the way described, such modules can independently induce this process. Exploratory and off-line phases can then occur in separated modules, while the other modules maintain a controlled interaction with the environment.

To overcome the limitations of current "neuro" chips, multiple neurochips could be combined in a parallel, hierarchical and mixed parallel/hierarchical ("fractal") arrangement. The dimensionality of interconnections between those networks or modules generated that way is always lower than within the network implemented on the chip. This lower dimensionality can be used for increased stability and faster optimation (smaller search space). The eventual loss of flexibility should be minimized. To make good use of the increased number of modules and networks, each module should have its operation concentrated on a different subset of sensory values and control sets. This amounts to the creation of a topographic principle. This means that the control set of a module has its effects (via acting units) where the sensory values come from. If this is not clear from the design, then the subsets showing the highest correlation of sensory and control values are selected as topographically related.

The topographic principle applies within and between the hierarchies of networks too. Feedback signals and control sets go back in the hierarchy, where the information comes from. Some steps in the hierarchy may be skipped, but the assignment to a topographical domain stays the same. "Hierarchies" are here defined by the relation of signals to the Kohonen-maps of a module (especially the strategy generating network). A signal coming from "below" passes one of those Kohonen-maps in analogy to sensory information. Signals from "above" are passed directly to the strategy generating network. In default configuration, the network systems of the different modules are not connected to each other. Optionally, the connections between the network systems are organized in a way analogous to the connections between the strategy generating networks (see FIG. 2).

Mixed hierarchical/parallel means that there are hierarchical relations between those networks. But, at the same time, these networks have direct access to the same "sensory" information and project control sets to the same substructure despite the hierarchies between them. "Fractal" organization means that, within an architecture of interconnected strategy generating networks, each network (module) can be replaced by a combination of networks, which is analogous in arrangement (selfsimilar) to the whole architecture.

Especially useful is a mixed parallel/hierarchical/fractal arrangement, where a recursive replacement of single modules occurs depending on reward, success of learning and need. A high frequency of chaos states induces such replacement of a single network (system/module) by a pack of four mixed parallel/hierarchical arranged networks.

If a system consists of parallel or hierarchical organized network-module controls such as, for instance, an ensemble of step motors of a multi-joint arm, then it is inevitable that the control set of one step motor (joint) will have an effect on the other joints and, especially, on the position of the most distal limbs. This interdependence is pronounced by the topographically organized mode of operation, in which each network focusses on different input/output domains. A network B then has to deal with the effects of control sets of a network A, even though the effect has been primarily caused by network A. Therefore, the network B can only partially compensate for those effects. For the sake of stability, the network A should be informed about such (nonlocal/nontopographic) side effects. Due to the reduced dimensionality of communication between the networks A and B (eventually one or more networks C have to be passed on this line of communication), the necessary flow of information is too slow or otherwise insufficient. A system ("cerebellum") is needed that compensates for such unintended dynamic side effects of control sets (generated by different modules).

The system has to compensate for the low connectivity between the networks A and B and, eventually, for the large time constant of communication. To avoid unnecessary labor, it is useful for the system to focus its corrective operation on a fast time scale which the compound network can not perform (determination of lower limiting frequency). On the other hand, it is not useful to generate control sets faster than the positioning element can follow (higher limiting frequency). Accordingly, signal processing takes place within a limited frequency range (=bandpass filter). Therefore, all input and output values are bandpass filtered. The system consists of a high dimensional, closed loop, regulator and a feedforward network. The network associates correcting control sets generated by the regulator (defined as a difference between actual position of a positioning element and an intended position implicit in the control set of the strategy generating network) with the (eventually delayed) control sets generated by the strategy generating network. Due to this association, the correction is produced by the feedforward network by the control set of the strategy generating network alone, anticipating the action of the regulator. The action of the regulator, while fast but always in response to the disturbance for which it has to compensate, is increasingly replaced by the feedforward network.

Training and working phases are distinguished. During the training phase, the bandpass filtered control sets from the strategy generating network paired with the correcting signals from the regulator are slightly delayed. Now, the corrective signals of the feedforward network are generated in response to the control sets before a disturbance is detected in the regulator. The pair of values, paired or stored in the feedforward network, consists of the correcting signals and the control set of the strategy generating network.

During the working phase, the control set induces the correcting signal in the feedforward network before (according to the delay used in the training period) the failure becomes manifest.

At the periphery, the control sets from the compound network and from the bandpass filtered correcting signals from the regulator and from the feedforward network are considered in a specific way. Topographic principles and the assignment to the right components are preserved when the correcting signals are superposed with the control sets (eventually normed). The correcting signals can be integrated and amplified with a typical time constant, which is suitable for operation of the compound strategy generating network. In this way, the compound strategy generating network is, on the one hand, informed about mismatches of regulation and can, on the other hand, learn as much as possible of the correcting signals to relieve the feedforward network. It is useful to do training of the feedforward network at the same time as the network system and strategy generating network. Offline training requires a short term memory for the correcting signals. Otherwise, learning of the feedforward network has to take place online (during movement).

BRIEF DESCRIPTION OF THE DRAWINGS

A demonstrating example and other advantages are explained on the basis of FIGS. 1 to 4.

DESCRIPTION OF THE PREFERRED EMBODIMENTS

Figure 1:
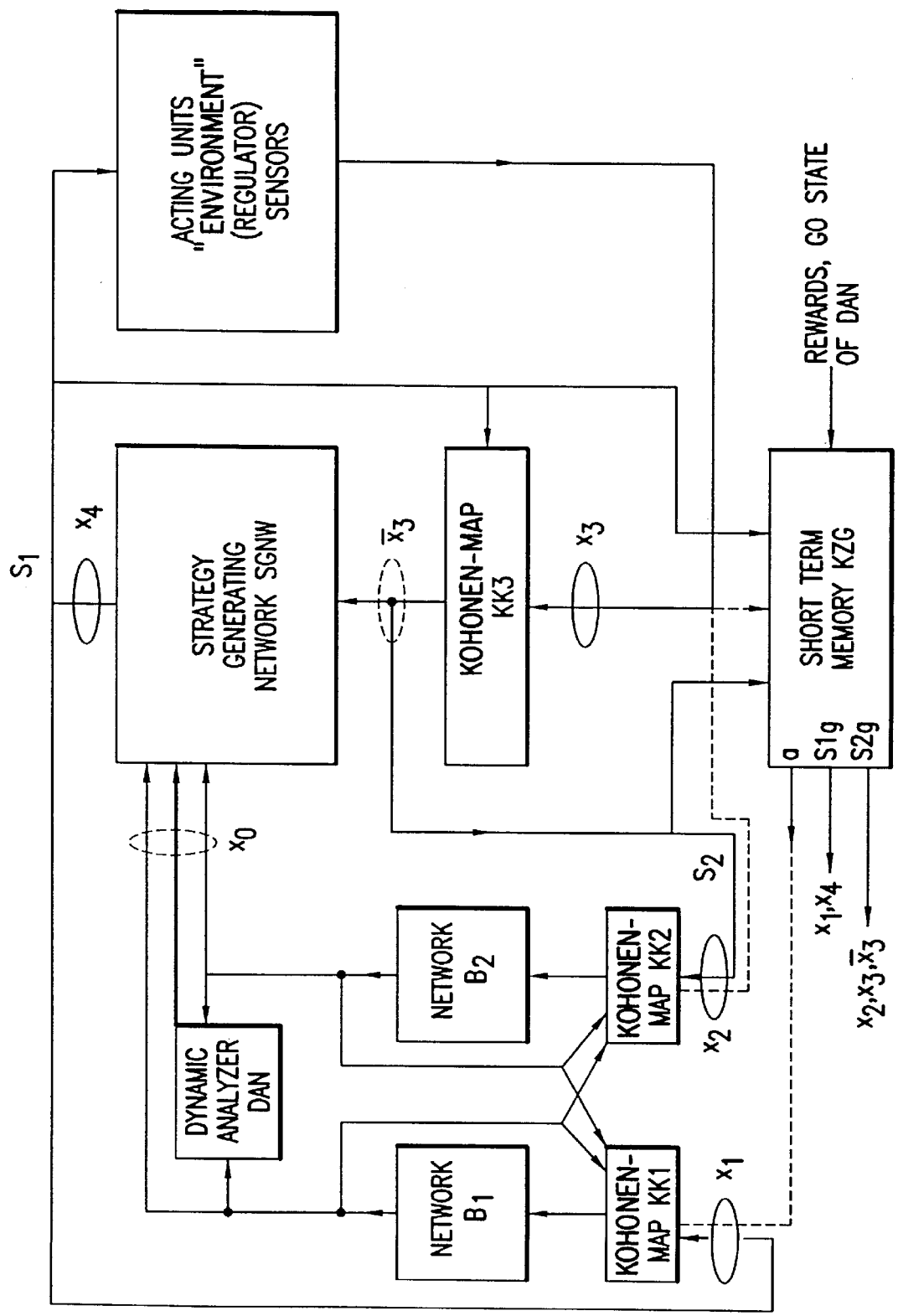
FIG. 1 shows one demonstrative example of the invention which includes a strategy generating network and various other networks.

Dashed lines in FIG. 1 show optional connections. In FIG. 1, the letter "a" stands for a value derived or calculated from the short term memory, especially a delayed value. The characters "S1g" and "S2g" identify the values stored in the short term memory which are used as training samples. During either an initial or a later (during or intermittent operation) training phase, these values replace the input from the sensory devices and the corresponding control sets. In the drawing, this is indicated by circles surrounding the corresponding lines of connection.

The sensory device SE, consisting of one or more sensors, captures sensory values S2 which are arranged into the form of one or more multicomponent vectors. These values serve as input for the networks B2 and SGNW (strategy generating network). The network B2 has an obligate Kohonen-map KK2 and the strategy generating network SGNW has an optional preprocessing Kohonen-map KK3. The vector(s) S1 generated by the network SGNW in response to S2 are control sets for the acting units HE. The vectors S1 serve as input to network B1 with an obligate Kohonen-map KK1. Signals have to pass the Kohonen-maps KK1 and KK2 before they reach and are transformed by the networks B1 and B2. The associative networks B1 and B2 feed their output back to their own preprocessing Kohonen-maps KK1 and KK2 (optional). The other feedback path connects the output of the network B1 to the map KK2 and the output of the network B2 to the map KK1. Additionally, the outputs of the networks B1 and B2 are analyzed by the dynamic analyzer DAN to distinguish between stable and unstable output values. The result of the analysis conducted by the dynamic analyzer DAN, which indicates a go state, a no-go state, or a chaos state, is given, as input, to the network SGNW in addition to the output values of the networks B1 and B2. Depending on its inputs (and connectivity), the network SGNW generates a new control set S1 which is directed to the acting units HE and the network B1. The actions induced by the set S1 may lead to a change which is captured by the sensory devices SE and coded as vectors S2. S2 again serves as input to networks B2 and SGNW. The control set S1 and the sensory values S2 converge on the preprocessing Kohonen-map KK3 connected to the network SGNW. The sensory values S2 captured by the sensory devices SE and the control sets S1 are buffered in a short term memory KZG.

The method forming the subject matter of this application includes two modes of operation. In a training session, selected pairs of values S1g/S2g are given as learning samples xn (n =1, . . . , i) to the Kohonen-maps KK1 and KK2 of the networks B1 and B2. In the same way, the values are given to the strategy generating network SGNW. According to these samples, synapses (weights) change in the networks B1, B2 and SGNW (preprocessing Kohonen-maps included). In this process, the outputs of the networks B1 and B2 (of the network system) and the output of the dynamic analyzer DAN are considered only after they have been stabilized and transformed into go states by previous training. After the training session is completed, the robot is set into action by a first control set S1 or S2, placing the robot into a task specific S1S2 subspace as discussed previously. The induced control sets S1 lead to an action which changes the sensory values S2. The new values S2 are fed into the strategy generating network SGNW via the Kohonen-map KK3 and into the network B2 via the Kohonen-map KK2. Additionally, the short term memory KZG receives the sensory values. According to these values S2, captured by the sensory devices SE, the strategy generating network SGNW generates control sets Si. The sets S1 are given to the network B1 via Kohonen-map KK1, the acting units HE and to the SGNW itself via Kohonen-map KK3. The output values of each of the networks B1 and B2 are fed back to both associated Kohonen-maps KK1 and KK2. The dynamic analyzer DAN receives the output values of B1 and B2, as does the strategy generating network SGNW. The dynamic analyzer distinguishes go, no-go, and chaos states according to the stability of the output values of B1 and B2. The strategy generating network is informed about these states and generates, according to these and the other inputs, a control set S1 which, in turn leads to a change of the sensory values S2 captured by the sensory device SE. If this sequence of action leads to stable output values of the networks B1 and B2, then the corresponding pair of values S1/S2 is trained to the networks SGNW, B1 and B2. The pairs of values previously recorded in the short term memory KZG are included in this training process. Now the "positive" experience of the robot is used immediately in such a way that the previously unknown pairs of values preceding known pairs of values in the short term memory KZG are converted into known pairs.

Figure 2:
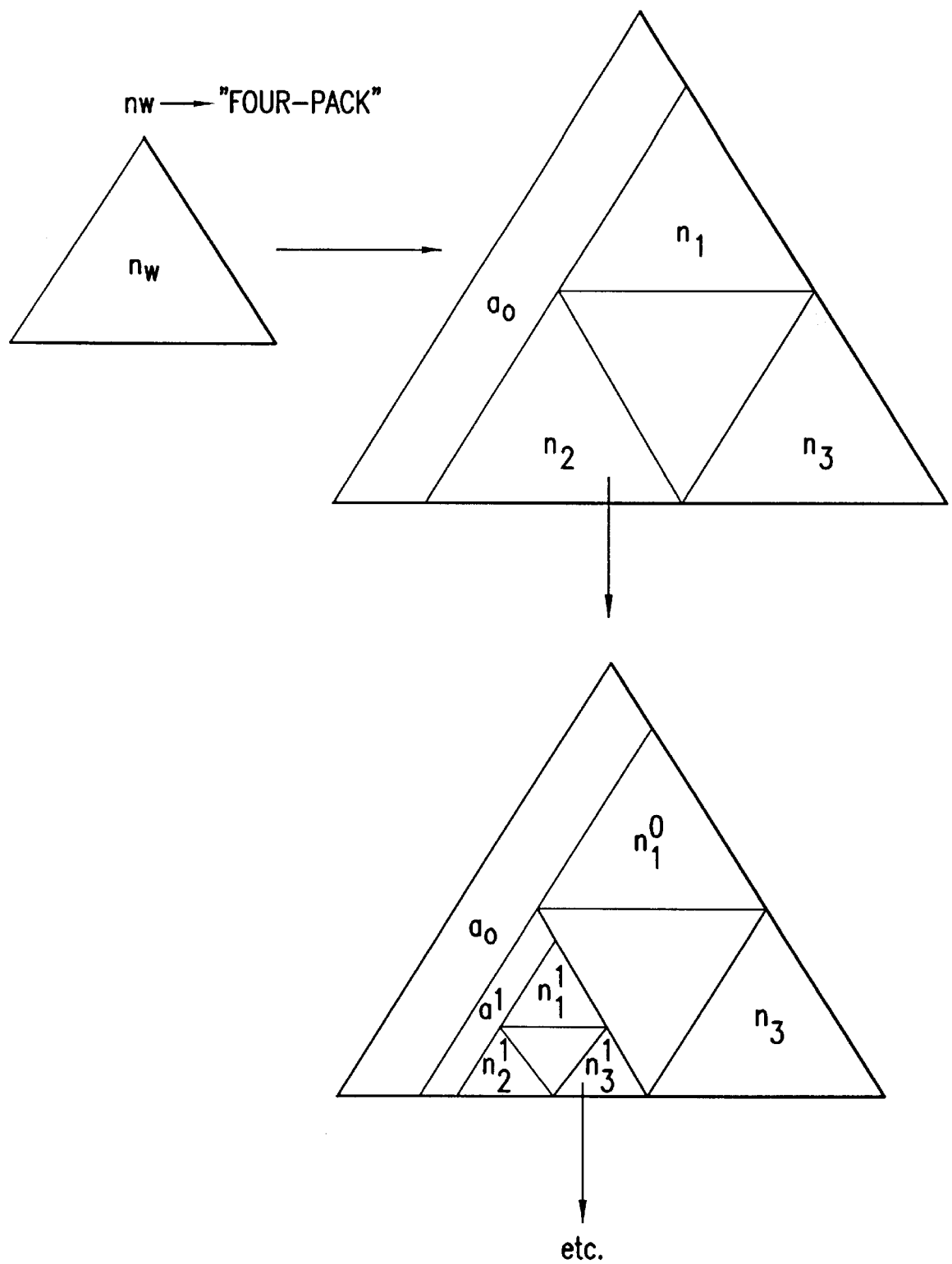
FIG. 2 shows another example of the invention which includes a mixed hierarchical network configuration.

FIG. 2 shows an example of the invention in which the previously described network configuration is replaced by a mixed hierarchical "four-pack" network configuration. The network nw consisting of a strategy generating network and a network system is replaced by four networks a0, n1, n2, n3 of the same design. Here a0 corresponds to the old network nw and the other networks n1–3 are new. In the drawing, any network could be replaced. The network n2 is now replaced by a "four-pack" of the next generation, etc. The new networks n1, n2, n3 lie in bypass to the old network a0 (nw) and can learn the repertoire of a0 successively until a0 allows the propagation of the output values of n1, n2, n3. Functional integrity is preserved this way. The old network a0 overtakes the management and the recombination of all the input/output relations of the networks n1, n2, n3 by setting their relative weights in a superposition process. This weighted superposition is especially important for the peripheral (to HE) or feedback output of the combined "four-pack", where the four vectors have to be compressed into the old format of control sets S1 (of nw).

Figure 3:
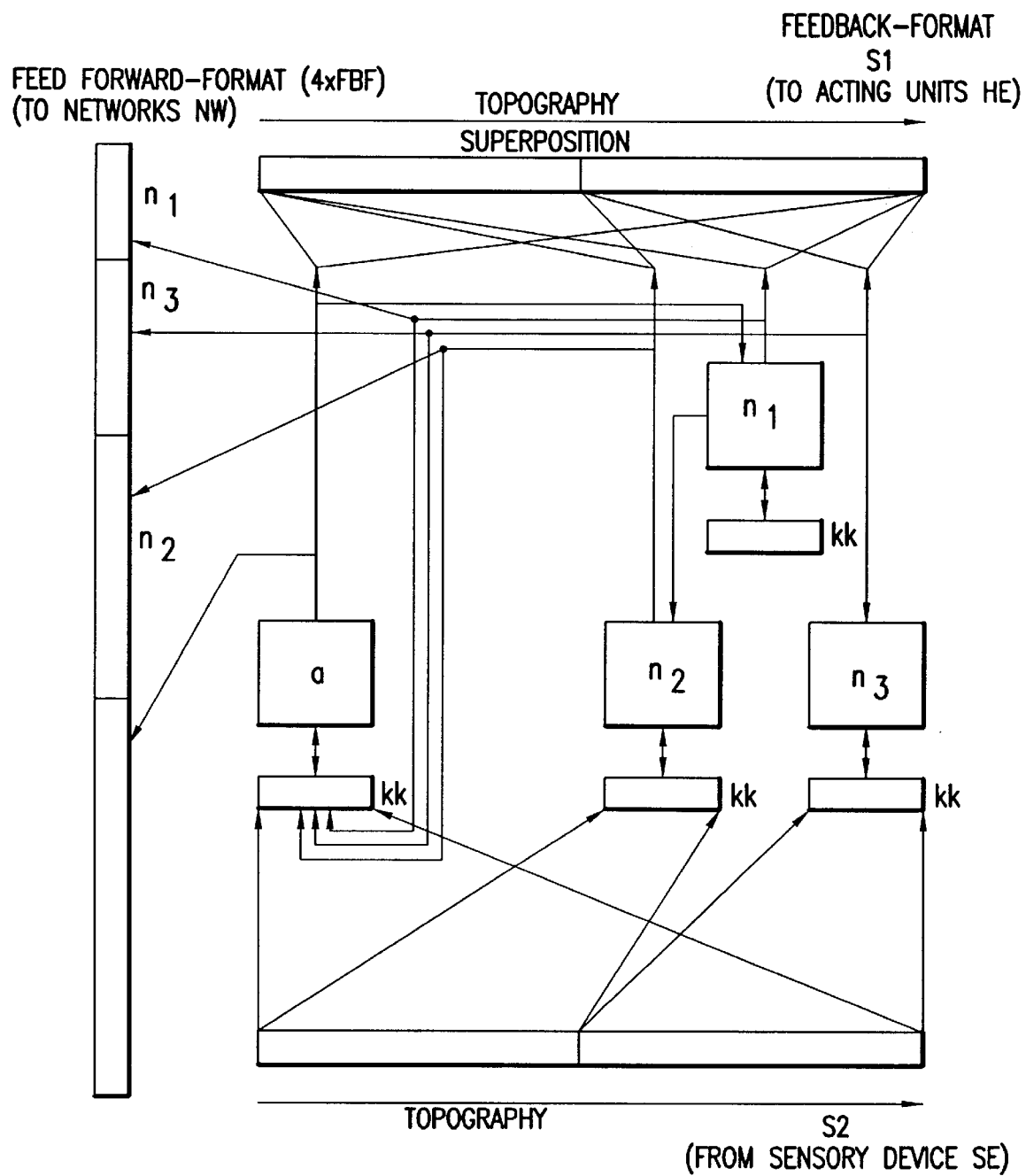
FIG. 3 is a detailed illustration of the example shown in FIG. 2.

This superposition process is explained in more detail in FIG. 3. The repertoire of feedback output is at least tripled by this approach, even if a very primitive (binary) weighing is used. In general, the feedforward projection FF to a hierarchical superior network (not included in the drawing) needs no compression of components of the outputs of the four networks a0, n1, n2, n3. This is because the Kohonen-map(s) of the superior network should provide enough space to receive the outputs of the networks a0, n1, n2, n3 in parallel (as one vector with 4n components, n output components of a single network).

Additionally, "maps" (as known in neurobiology) can be viewed as a special case of a parallel expansion, especially when identical subunits are used in a topographical arrangement.

FIG. 3 is a more detailed elaboration of FIG. 2, focussing on the internal lines of communication and the organization of input/output relations of the "four-pack". The sensory values S2 captured by the sensory device SE are topographically organized. The output of the networks a0 and n1 are topographically organized and have the right format of the control set directed to acting units HE and subordinate networks. They can be directly superposed to form a valid control set. For the networks n2 and n3, the neighboring components of the output have to be summarized into one component to create the right format of a topographically ordered control set, which can be superposed with the output of n1 and a0 to form the new control set S1 (in feedback-format). Because enough space is available in the receiving structures, the feedforward projection FF of the "four-pack" a0, n1, n2, n3 does not need to be compressed into the feedback format FB.

An intermediate format is the doubled feedback format having twice as many components. The topographically united outputs of n2, n3 build the backbone of this format. The format of the outputs of a0 and n1 is inflated to the double number of components. Simple doubling of values or interpolation and interposition of neighboring values can be used to generate the inflated format. Weighted superposition follows.

The control of a0 on the initial learning phase of n1, n2, n3, in which the repertoire of nw is transferred into the whole "fourpack", can be achieved by tuning the following parameters. Every odd input component to a0 (nw) is replaced by $S2_k^*(1-q)+q^*S2_{k+1}$; each square input component is replaced by $S2_k^*(1-q)+q^*S1_{k/2n1-3}$. $S2_k$ is the kth component of the sensory input S2, and $S1_{k/2n1-3}$ is the k/2(=m)th component (k is square) of the united vector of the output of the networks n1, n2, n3. q stays zero as long as the output values of n1, n2, n3 in feedback format approximate the output of a0. This can easily be done by training of the same pairs of values— generated by a0— to the other networks. These pairs are assigned to the networks according to the topographic principle. Before completion of this training, the superposition parameter (relative weight) for a0 is 1 and, for the other networks of the "four-pack", zero. After completion of the initial acquisition of the repertoire of a0—identical with the expanded H of a0—the parameter q and the weights of superposition are free for variation. In principle, each network could initiate learning processes (reaching and expanding its share of H) separately on the basis of the dynamics of its own network system. However, for the sake of stability of the system, it is useful to keep the option to limit this autonomy. Learning should be only allowed if the chaos/stable transition is either synchronized to a transition of the topological neighbors or the neighbors show a stable state.

Figure 4:
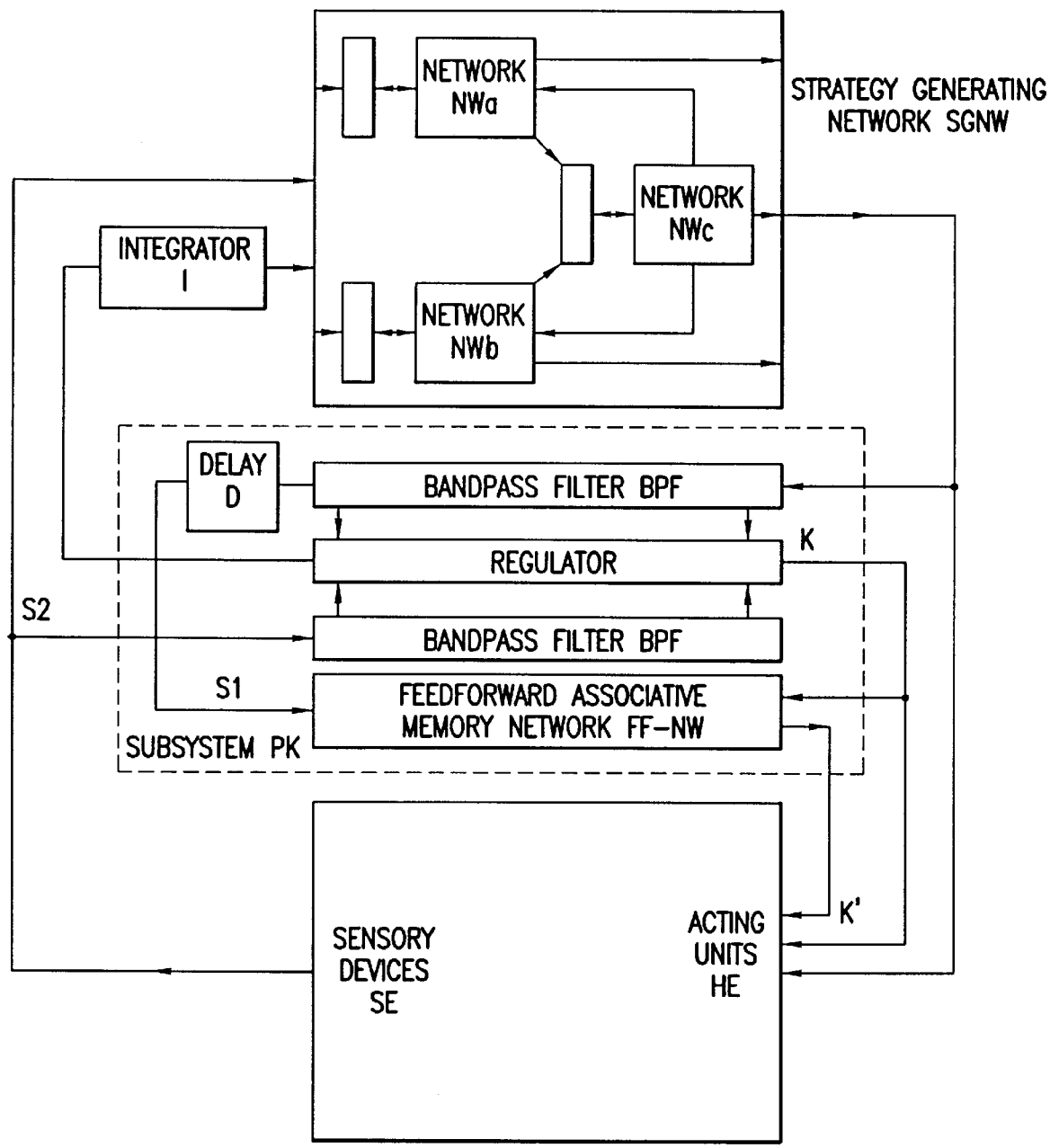
FIG. 4 shows yet another example of the invention which includes strategy generating network and network system modules.

FIG. 4 shows an example in which the compound network configuration consists of modules. Each of these modules consists of a strategy generating network and network system (plus KZG and DAN). The outputs S1 go to the acting units HE and the subsystem PK. The subsystem PK consists of bandpass filters BPF, a regulator between the bandpass filters BPF and a feedforward associative memory network. In the line of communication, an integrator with the time constant of the compound network and a delay D are interposed. This delay is only active during the training process and, otherwise, is bridged. The consequences of the control sets S1 and the corresponding corrective signals K and K' from the subsystem PK, which all together control the acting units HE, are captured by the sensory devices SE and provided to the compound network and the subsystem PK.

It is to be understood that the examples described above are only illustrations of inventive embodiments.

I claim:

1. A method for controlling an autonomously exploring robot comprising the steps of:

capturing values, using a sensory device, which are fed as input values into an artificial neuronal strategy generating network, generating control values with the strategy generating network, according to input and trained synapse strengths, which control acting units of the robot, feeding the values captured by the sensory device and the control values generated by the strategy generating network into an artificial neuronal network system including a plurality of further networks, storing said input values of the sensory device and corresponding control values, which constitute pairs of values, into a short term memory, distinguishing between pairs of values learned during a training phase and unknown pairs of values with a dynamic analyzer on a criterion of dynamic stability of the network system, extending an initial repertoire of said strategy generating network and the network system by assimilation of selected values captured by the sensory device and the control values generated with the strategy generating network in a training process when the dynamic analyzer identifies a pair of values as known and belonging to a successful string of values, selecting unknown pairs of stored values which precede the known pair of values, training the network system until adaptation of synapses strengths of the network system results in a stable output pattern, feeding the strategy generating network with the stable output pattern, and the selected unknown pairs of values, and training the strategy generating network, until all selected pairs of stored values are trained, thereby extending the initial repertoire of the strategy generating network and network system.

2. A method according to claim 1, and further comprising the steps of:

utilizing a recursive learning scheme, and increasing a length of a solution path determined by a stored repertoire of pairs of values.

3. A method according to claim 1, and further comprising the step of varying stored pairs of the values to increase a repertoire of the robot.

4. A method according to claim 3, and further comprising the step of varying the control values which are fed into the strategy generating network by unstable dynamics of the network system and a classification of a dynamic analyzer when a new pair of values is present.

5. A method according to claim 3, and further comprising the steps of systematically generating new variants in an on-line exploratory phase by replacing a subset of the control values generated with the strategy generating network with random values, and subsequently storing said new variants.

6. A method according to claim 3, and further comprising the steps of disconnecting the networks from the sensory device and acting units in an off-line phase, replacing the captured values by random values with tunable amplitude, and selecting resulting sequences of pairs of values according to different criteria and trained to the networks of the strategy generating network and the network system.

7. A method according to claim 1, and further comprising the step of inputting output values of the plurality of further networks of the network system to the strategy generating network.

8. A method according to claim 1, and further comprising the step of feeding output values of the plurality of further networks of the network system into a dynamic analyzer which determines trained pairs of values from unknown pairs of values based on stability of the output values.

9. A method according to claim 8, and further comprising the step of giving a result of the dynamic analyzer as additional input to the strategy generating network.

10. A method according to claim 8, and further comprising the step of giving the output values of the plurality of further networks of the network system as inputs simultaneously to the strategy generating network and the dynamic analyzer.

11. A method according to claim 1, and further comprising the step of preprocessing the values fed into the network system by Kohonen-maps.

12. A method according to claim 1, and further comprising the step of preprocessing the values which are fed into the strategy generating network by at least one Kohonen-map.

13. A method according to claim 1, and further comprising the step of providing, during the training phase, selected pairs of values as learning examples to the strategy generating network and to the plurality of further networks of the network system.

14. A method according to claim 1, and further comprising the steps of delivering desired performance by taking into account inherent symmetry of an arrangement of the network system while training on the network system, guaranteeing symmetry of reciprocal interconnections between the plurality of further networks of the network system for trained pairs of values which stays stable despite fluctuations which reveal asymmetry introduced by said unknown pairs of values by inducing instability, and establishing symmetry for newly stored pairs of values while affecting previously stored patterns as little as possible.

15. A method according to claim 14, and further comprising the step of replacing the values captured by the sensory device and the control values generated by the strategy generating network during the training phase.

16. A method according to claim 1, and further comprising the step of using the capturing, generating, feeding and distinguishing steps as a module in a bigger network of such modules.

17. A method according to claim 1, and further comprising the steps of generating a fractal network architecture by recursive replacement of a single module with a pack of four interconnected modules, and interconnecting the modules so that interconnection within the pack is organized hierarchically while the connections of the pack to outside structures are organized in parallel.

18. A method according to claim 17, and further comprising the steps of keeping a repertoire of the single module and maintaining functional continuity with one of said four interconnected modules until the other modules of said four interconnected modules acquire a sufficient repertoire from said one of said four interconnected modules, and controlling composition of an output of the pack by controlling superposition weights with said one of said four interconnected modules.

19. A method according to claim 17, and further comprising the steps of communicating two of said interconnected modules with nonoverlapping subsets of the sensory device, and consequently performing different input/output relations with acting units so that division and corresponding reassembling of domains of operation define a topographic principle and are performed with regard to a periphery.

20. A method according to claim 19, and further comprising the step of receiving a feedback projection of an output of one of said two of said interconnected modules with at least one other of said four interconnected modules so that a feedback projection is not filtered by a Kohonen-map.

21. A method according to claim 17, and further comprising the steps of receiving, with one of said interconnected modules, an output of two others of said interconnected modules, projecting the output back to a united domain of the acting units and reassembling outputs of all modules in a weighted superposition.

22. A method according to claim 21, and further comprising the step of receiving, with said one of said interconnected modules, a feedback input from an output of another module in said united domain.

23. A method according to claim 17, and further comprising the steps of receiving, with one of said interconnected modules, outputs from the other modules of said interconnected modules and from a whole domain of a periphery, sending, from said one of said interconnected modules, control sets to all acting units of a topographic domain of the pack, and controlling, with said one of said interconnected modules, superposition of outputs of all modules of the pack.

24. A method according to claim 17, and further comprising the step of precluding superposition of parallel outputs of the pack of four interconnected modules if a receiving structure provides enough lines of communication to receive the output of all of said four interconnected modules in parallel.

25. A device for controlling an autonomously exploring robot comprising:

an artificial neuronal strategy generating network which generates control values for acting units of the robot according to input and trained synapse strengths, a sensory device for capturing values from an environment which are fed into the strategy generating network as input values, acting units which receive control values from the strategy generating network, a short term memory for storing said input values of the sensory device and corresponding control values, which constitute a pair of values, an artificial neuronal network system, including a plurality of further networks, which is supplied with the values captured by the sensory device and the control values generated by the strategy generating network, generates stable output values upon receiving a pair of values already learned during a training process, and generates instable output values upon receiving an unknown pair of values, output values of the artificial neuronal network system being supplied to a signal generating network, and a dynamic analyzer for distinguishing between pairs of values learned during a training phase and unknown pairs of values on the criterion of dynamic stability of the network system, an output of which may be connected to the strategy generating network.

26. A device according to claim 25, wherein the network system includes two networks.

27. A device according to claim 26, wherein each network is connected to a preprocessing Kohonen-map, output values of each network being back to the network's own preprocessing Kohonen-map and to the preprocessing Kohonen-map of the other network.

28. A device according to claim 27, wherein the dynamic analyzer receives the output values of the networks of the network system, and classifies the input to the network system, based on stability of the output values of the two networks, as known or unknown, classification of the stability of the output of the two networks falling into classes of local and global, go, no-go, and chaos states, the classification and output values of the networks being given as input to the strategy generating network.

29. A device according to claim 28, wherein the dynamic analyzer is a sliding register.

30. A device according to claim 28, wherein the dynamic analyzer is a Fourier-analyzing device with subsequent comparison of spectra.

31. A device according to claim 25, wherein the short term memory is designed as a sliding register.

32. A device according to claim 25, wherein the values captured by the sensory device and the control values generated by the strategy generating network converge on a preprocessing Kohonen-map which supplies its output to the strategy generating network.

33. A device according to claim 25, and further comprising equally designed interconnected modules which, together with the device, form a superarchitecture.

* * * * *